Figure 1:
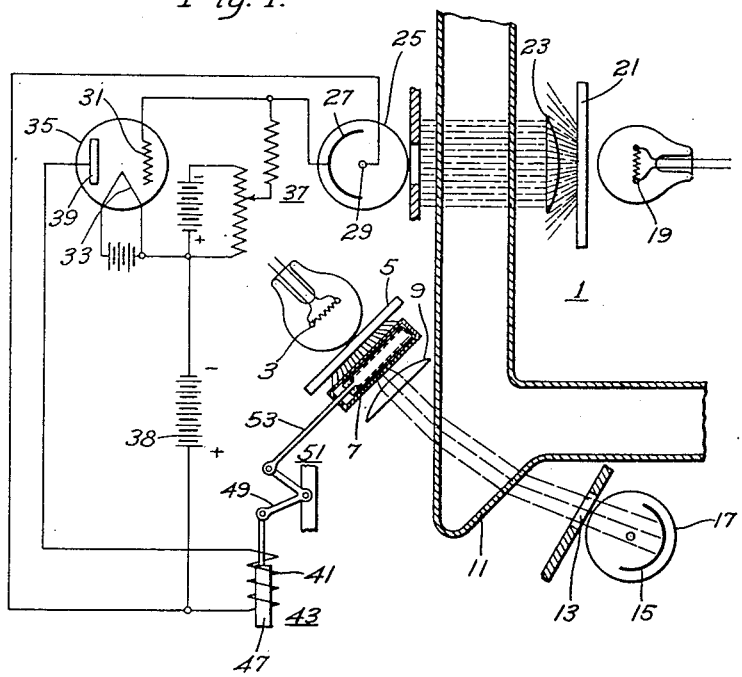

April 25, 1933.                C. A. STYER                1,905,251

SELF COMPENSATING LIGHT CONTROL

Filed June 27, 1931

WITNESSES:

INVENTOR
Charles A. Styer.
BY F. W. Lyle.
ATTORNEY

Patented Apr. 25, 1933

1,905,251

UNITED STATES PATENT OFFICE

CHARLES A. STYER, OF FOREST HILLS, PENNSYLVANIA, ASSIGNOR TO WESTINGHOUSE ELECTRIC & MANUFACTURING COMPANY, A CORPORATION OF PENNSYLVANIA

SELF COMPENSATING LIGHT CONTROL

Application filed June 27, 1931. Serial No. 547,446.

My invention relates to photo-sensitive apparatus and has particular relation to apparatus of a type utilized in making a chemical analysis of fluids.

In photo-sensitive apparatus of the type utilized in the analysis of fluids, the fluid is ordinarily transmitted through a tube. A source of radiant energy is disposed adjacent to the tube on one side and a radiant-energy-responsive device, such as a photo cell, is disposed on the opposite side. The radiations from the source are transmitted through the fluid and impinge on the sensitive surface of the radiation-responsive device.

A fluid ordinarily has a plurality of optical properties which may be utilized in analyzing it for its characteristics. Such properties are color, transmissibility, refraction, dispersion, polarization by reflection, light-scattering power, etc. The apparatus which is provided for analyzing a particular fluid is so arranged as to respond with facility to the optical property of the fluid by which its characteristics are being studied.

It is a well known fact, however, that fluids contain impurities which ordinarily tend to vitiate the effects of the optical measurements. In general, the transmissibility and the color of the fluid are more affected by the impurities than any other properties thereof, and, at times, it is difficult to measure the variations in an optical property of the fluid by reason of the fact that considerable additional variations are introduced by the impurities.

Moreover, the uncertainty of the variations is increased by reason of the fact that the source of energy, that is utilized for exciting the source of radiations, does not ordinarily have a constant output, and, consequently, vitiating variations are introduced by reason of the fluctuations in the energy impressed on the source of radiations.

It is, accordingly, an object of my invention to provide, for apparatus of a type utilized in optically analyzing a fluid, a device for compensating for the vitiating influence of the irregularities introduced by reason of the non-uniform operation of the apparatus.

A further object of my invention is to provide for apparatus of the type utilized in optically analyzing a fluid, a device for compensating for the vitiating optical effects introduced by reason of the impurities in the fluid.

A specific object of my invention is to provide for apparatus of a type utilized in the analysis of the optic properties of a fluid, a contrivance for compensating for the variations in transmissibility introduced by reason of the varying proportions of impurities present in the fluid.

A further specific object of my invention is to provide for apparatus of a type utilized in the analysis of a fluid by the detection of variations in its optic properties, a contrivance for the variations in the color of the fluid introduced by reason of the impurities present therein.

Another specific object of my invention is to provide, for a source of radiant energy, a device that shall so vary the radiations emitted from the source that the variations, introduced into the source by reason of the fluctuations in the supply whereby it is energized, shall be compensated.

More concisely stated, it is an object of my invention to provide, for apparatus of a type utilized in analyzing a fluid by measuring the variations in its optical properties, a contrivance whereby the variations introduced by reason of the impurities in the fluid, and the variations introduced by reason of the fluctuation in the intrinsic brightness of the source incorporated in the system are compensated.

According to my invention, I provide a fluid-analyzing system comprising a tube through which the fluid is transmitted. A beam of radiant energy, emanating from a source disposed adjacent to the tube and limited by a variable diaphragm, is transmitted through the fluid and impinges on the sensitive element of a photo-sensitive device.

In the specific embodiment of my invention that is described herein, the fluid is analyzed by the detection of variations in its refractive index. The photo-sensitive device is, therefore, disposed behind an aperture in such manner that the section of the beam transmitted through the fluid that impinges on the photo-sensitive surface is a function of the refractive index of the fluid.

To compensate for the vitiating influences of the impurities in the fluid, a second beam of radiant energy is projected through the fluid and impinges on the photo-sensitive surface of a second photo-sensitive device. The photo-sensitive device is connected in the control circuit of an electric-discharge device of the high-vacuum type, and the current transmitted between the cathode and the anode of the device passes through the exciting coil of a relay, the core of which co-acts with a plurality of levers to vary the opening in the diaphragm whereby the radiant beam, transmitted to the analyzing photo-sensitive device, is limited.

If the transmissibility of the fluid is low, the opening of the diaphragm is increased in area. On the other hand, if the transmissibility is high, the opening of the diaphragm is decreased. It is seen that the variations in the condition of the fluid, by reason of its varying content of impurities, are thus compensated by varying the radiant energy transmitted through the fluid for testing purposes.

The compensating photo-sensitive device may, furthermore, be selected to have a predetermined color characteristic. If the direction of operation of the associated relay is now properly adjusted, the vitiating influences of colored impurities may be compensated. If the impurities have a tendency to introduce a given color, that response of the diaphragm may be regulated to vary as the color increases or decreases.

Moreover, the intensity of the source of radiant energy may not be constant, by reason of the fluctuations in the power supply whereby the source is energized. The fluctuations in the power supply are compensated by introducing corresponding variations in the radiant beam transmitted from the source. This object is accomplished by varying the opening in the diaphragm in the herein-described embodiment of my invention. It may also be accomplished in numerous other ways; for example, by varying the transparency of a filter disposed in the path of the beam.

Figure 2:
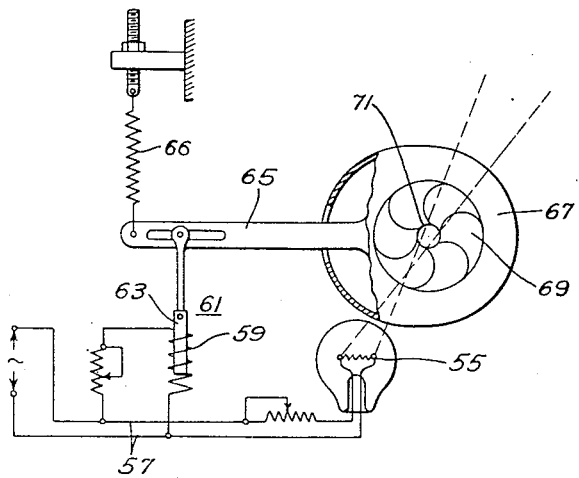

The novel features that I consider characteristic of my invention are set forth with particularity in the appended claims. The invention itself, however, both as to its organization and its method of operation, together with additional objects and advantages thereof will best be understood from the following description of a specific embodiment, when read in connection with the accompanying drawing, in which:

Figure 1 is a schematic view showing the essential elements of a system constructed according to my invention, and Fig. 2 is a diagrammatic view showing a system for compensating for the variations in the radiant energy emitted by the source that are introduced by reason of the fluctuations in the power supply whereby the source is energized.

The apparatus shown in Fig. 1 comprises a tube 1 through which the fluid to be analyzed is transmitted. A source 3 of radiant energy, a diffusing screen 5, a variable diaphragm 7 and a collimating lens 9 are disposed adjacent to a protruding section 11 of the tube 1, and a collimated beam of radiant energy from the source 3 is transmitted through the section 11. The beam is limited by a slot 13 and impinges on the sensitive surface 15 of a photo-sensitive device 17. The photo-sensitive device 17 may be connected to an indicating meter or to a recording meter (not shown) in a manner well known in the art. It may also be so connected as to operate controlling apparatus in a manner which is also well known in the art.

The radiant energy transmitted through the fluid is refracted thereby, and its direction is varied in accordance with the magnitude of the refractive index of the fluid. The slot 13 is so inserted, relative to the beam of radiant energy, that the magnitude of the radiations transmitted through the slot is a function of the refractive index of the fluid.

A second light source 19, a diffusing screen 21 and collimating lens 23 are disposed adjacent to the tube 1 above the protruding section 11. A second beam of radiant energy is, therefore, transmitted through the tube 1 and impinges on a photo-sensitive device 25 suitably disposed in the path of the beam.

The electrodes 27 and 29 of the photo-sensitive device 25 are connected, respectively, to the control electrode 31 and to a principal electrode 33 of an electric-discharge device 35, preferably of the vacuum type, through a potentiometer 37 and a power supply 38. The principal electrodes 33 and 39 of the electric-discharge device 35 are connected through the exciting coil 41 of a relay 43 and the power source 38.

The core 47 of the relay 43 is pivotally secured to an arm 49 of a bell crank 51 which is pivotally supported. The bell crank 51 is pivotally fixed to a movable arm 53, whereby the opening in the diaphragm 7, which regulates the magnitude of the radiant energy transmitted to the photo-sensitive device 17 in the indicating system, is varied.

As the state of excitation of the compensating photo-sensitive device 25 is increased, the control electrode 31 of the electric-discharge device 35 becomes more positive relative to the cathode 33, and the excitation of the coil 41 of the relay 43 connected in the principal circuit of the device 35 is so varied that the opening in the diaphragm is decreased. The radiant energy transmitted to the photo-sensitive device 17 in the indicating system is thus decreased, and the variations in the transparency of the system are thus compensated.

In Fig. 2, a system is shown whereby the fluctuations in the power supply are compensated. Illustration of the compensating means is omitted from Fig. 1 for purposes of clarity. As a matter of fact, such compensating means is, ordinarily, included in the system, although, for analyses which do not require the highest degree of accuracy, it may be omitted.

The apparatus shown in Fig. 2 includes a source 55 of radiations, such as is utilized in apparatus of the type shown in Fig. 1, which is energized from any suitable power supply, through a plurality of leads 57. The exciting coil 59 of a relay 61 is connected across the power-supply source, and the core 63 of the relay is mechanically coupled to an arm 65, whereby the opening in a diaphragm 67 is varied. The arm 65 is resiliently urged in one direction by a spring 66 and is pulled in the opposite direction by the core 63 of the relay 61. The force exerted by the core 63 on the arm 65 is dependent upon the state of excitation of the relay 61, and the angular displacement of the arm 65 varies with the excitation of the coil 59. The angular position of the arm 65 thus varies with the variations in the voltage impressed across the source 55.

The arm 65 is secured to the diaphragm leaves 69 in a manner well known in the art and the arm 65 and the diaphragm 67 are so oriented relative to the relay 61 that, if the voltage impressed across the radiant source 55 is increased, the area of the diaphragm opening 71 is decreased.

The mechanical coupling between the arm and the diaphragm has not been shown in detail herein, since it is well known in the photographic apparatus art, and such description would, therefore, be superfluous.

My invention has been specifically illustrated hereinabove as applied to the analysis of a fluid in motion through a conductor. It may equally as well be applied to a fluid substantially at rest, as in a reaction vessel.

Although I have shown and described certain specific embodiments of my invention, I am fully aware that many modifications thereof are possible. My invention, therefore, is not to be restricted, except insofar as is necessitated by the prior art and by the spirit of the appended claims.

I claim as my invention:

1. In apparatus for detecting the variation in properties of fluids by measuring the variation of the optical properties of said fluids, photo-sensitive means for compensating for the vitiating influence of impurities in said fluids.

2. In apparatus for detecting the variation in properties of fluids by measuring the variations of the optical properties of said fluids, means for compensating for the vitiating effects of impurities in said fluids, said means including a photo-sensitive device responsive to the condition of said fluid and an electron-discharge device responsive to the condition of said photo-sensitive device.

3. Apparatus for producing radiant energy comprising a source of radiations, means for energizing said source, and means responsive to the variations in said energizing means for limiting the beam of radiant energy emitted from said source.

4. Apparatus for producing radiant energy comprising a source of radiations, means for energizing said source, and means responsive to the variations in said energizing means for regulating the intensity of said radiant energy projected on a predetermined plane.

In testimony whereof, I have hereunto subscribed my name this 11th day of June 1931.

CHARLES A. STYER.

DISCLAIMER 1,905,251.—*Charles A. Styer*, Forest Hills, Pa. SELF COMPENSATING LIGHT CONTROL. Patent dated April 25, 1933. Disclaimer filed May 10, 1934, by the assignee, *Westinghouse Electric & Manufacturing Co.*

Hereby enters the following disclaimer:

(1) Your petitioner hereby disclaims the subject matter of claim 3 except as to apparatus in which the limitation is effected by an aperture having symmetry about an axis normal to its plane, said aperture being made up of a plurality of screens which move normal to said axis in response to the variations in the energizing means.

(2) Your petitioner hereby disclaims the subject matter of claim 4 except as to apparatus in which the limitation of the beam is effected by the movement of a plurality of screens at least three of which are all movable relative to each other.

[*Official Gazet May 29, 1934.*]

DISCLAIMER 1,905,251.—*Charles A. Styer*, Forest Hills, Pa. SELF COMPENSATING LIGHT CONTROL. Patent dated April 25, 1933. Disclaimer filed May 18, 1935, by the assignee, *Westinghouse Electric & Manufacturing Company*.

Hereby enters a disclaimer to the claims which are in the following words:

"Apparatus for producing radiant energy comprising a source of radiations, means for energizing said source, and means responsive to the variations in said energizing means for limiting the beam of radiant energy emitted from said source."

"Apparatus for producing radiant energy comprising a source of radiations, means for energizing said source, and means responsive to the variations in said energizing means for regulating the intensity of said radiant energy projected on a predetermined plane."

[*Official Gazette June 11, 1935.*]